(12) United States Patent
Baek et al.

(10) Patent No.: US 11,811,795 B2
(45) Date of Patent: Nov. 7, 2023

(54) METHOD AND SYSTEM FOR TRANSMITTING MULTIPLE DATA

(71) Applicant: KOREA AEROSPACE RESEARCH INSTITUTE, Daejeon (KR)

(72) Inventors: Hyun Chul Baek, Daejeon (KR); Tae Geun Son, Daejeon (KR); Dae Won Chung, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 17/539,861

(22) Filed: Dec. 1, 2021

(65) Prior Publication Data
US 2023/0034716 A1   Feb. 2, 2023

(30) Foreign Application Priority Data
Jul. 27, 2021   (KR) .......... 10-2021-0098629

(51) Int. Cl.
*H04L 1/00*   (2006.01)
*H04L 67/06*   (2022.01)
*H04L 9/40*   (2022.01)

(52) U.S. Cl.
CPC ........ *H04L 63/1416* (2013.01); *H04L 1/0061* (2013.01); *H04L 1/0083* (2013.01); *H04L 63/145* (2013.01); *H04L 67/06* (2013.01)

(58) Field of Classification Search
CPC . H04L 63/1416; H04L 1/0061; H04L 1/0083; H04L 63/145; H04L 67/06; H04L 63/0236; H04L 63/0245; H04L 63/0209
See application file for complete search history.

(56) References Cited

U.S. PATENT DOCUMENTS 6,477,669 B1 *   11/2002   Agarwal ............... H04J 3/0608
                                                     714/708
6,778,536 B1 *   8/2004   Ofek ..................... H04L 49/206
                                                     370/429

(Continued)

FOREIGN PATENT DOCUMENTS

KR   1020010060014 A   7/2001
KR      101080107 B1   11/2011
KR      102006149 B1   8/2019

OTHER PUBLICATIONS

Hyun Chul Baek et al., "Designing Flexible Packets for Multi-Satellite Data Transmission in a Physical Network Separation Environment", Journal of Aerospace System Engineering, vol. 14, No. 6, pp. 27-36, Dec. 31, 2020.

(Continued)

*Primary Examiner* — Muhammad Raza
(74) *Attorney, Agent, or Firm* — Rabin & Berdo, P.C.

(57) ABSTRACT

Provided are a method and a system for transmitting multiple data, in which the method includes receiving a plurality of transmission files for transmission from a transmission device of the first network to a reception device of the second network, and temporarily storing the received files, generating flexible packets by dividing each of the plurality of transmission files by a flexible packet length determined according to size of the files, in which a transmission file in a size smaller than the flexible packet length among the plurality of transmission files is generated as one flexible packet without being divided, loading the flexible packets into a plurality of flexible frames based on a corresponding transmission file priority according to a maximum data transmission size, and transmitting the plurality of flexible frames to the second network.

6 Claims, 7 Drawing Sheets

(56) References Cited

U.S. PATENT DOCUMENTS

| | | | | |
|---|---|---|---|---|
| 6,813,259 B1* | 11/2004 | Kumar | ................ | H04L 12/5601 370/347 |
| 6,859,442 B1* | 2/2005 | Agarwal | ............ | H04B 7/18582 370/477 |
| 6,963,570 B1* | 11/2005 | Agarwal | ................. | H04W 8/04 370/395.32 |
| 7,664,092 B2* | 2/2010 | Birdwell | ............ | H04B 7/18584 370/465 |
| 2002/0089935 A1* | 7/2002 | Chan | .................... | H04L 1/0007 370/252 |
| 2002/0161856 A1* | 10/2002 | Pineau | ............... | H04N 1/00127 709/219 |
| 2004/0042420 A1* | 3/2004 | Agarwal | ............... | H04L 1/0057 370/310.1 |
| 2004/0252688 A1* | 12/2004 | May | ........................ | H04L 12/42 370/389 |
| 2005/0259623 A1* | 11/2005 | Garudadri | ............ | H04N 19/102 370/335 |
| 2009/0132543 A1* | 5/2009 | Chatley | ............... | H04L 67/1001 |
| 2009/0296624 A1* | 12/2009 | Ryu | ....................... | H04H 20/72 370/312 |
| 2012/0296989 A1* | 11/2012 | Lee | ......................... | H04L 67/06 709/206 |
| 2015/0007328 A1* | 1/2015 | Zou | ........................ | G06F 21/552 726/24 |
| 2019/0098483 A1* | 3/2019 | Qi | ......................... | H04W 8/005 |
| 2019/0182363 A1* | 6/2019 | Bonaventure | ........... | H04L 47/70 |

OTHER PUBLICATIONS

Hyunchul Baek et al., "Study of Network Data Interface Technique using Flexible Packets", KSAS 2020 Fall Conference, Nov. 18, 2020 to Nov. 20, 2020.

Hyunchul Baek et al., "Network Interface Implement for Multi-Satellites Data using Flexible Packet", KSAS 2020 Fall Conference, Nov. 18, 2020 to Nov. 20, 2020.

* cited by examiner

FIG. 1

(PRIOR ART)

| Ⓐ | Start | Packet #1 | Packet #2 | Packet #3 | ... | Packet #N | End |
|---|---|---|---|---|---|---|---|
| | 4 bytes (123456789) | | Ⓑ | | | | 4 bytes (-123456789) |

FIG. 5

| | Header 6 bytes | | | | | Data | | CRC |
|---|---|---|---|---|---|---|---|---|
| ⓑ-① Start Packet (Flexible) | ID | Flag | Sequence | File Data Length | File Name Length | File Name | File Data | CRC |
| | 10 Bits | 2 Bits (00b) | 4 Bits (0 ~ 15) | 26 Bits | 8 Bits | Max 255 Bits | Max 67,108, 863 Bytes | 2 Bytes |

| | Header 6 bytes | | | | Data | CRC |
|---|---|---|---|---|---|---|
| ⓑ-② Continue Packet (Flexible) | ID | Flag | Sequence | File Data Length | File Data | CRC |
| | 10 Bits | 2 Bits (01b) | 4 Bits (0 ~ 15) | 26 Bits | Max 67,109,119 Bytes | 2 Bytes |

| | Header 6 bytes | | | | Data | CRC |
|---|---|---|---|---|---|---|
| ⓑ-③ End Packet (Flexible) | ID | Flag | Sequence | File Data Length | File Data | CRC |
| | 10 Bits | 2 Bits (10b) | 4 Bits (0 ~ 15) | 26 Bits | Max 67,109,119 Bytes | 2 Bytes |

| | Header 6 bytes | | | | | Data | | CRC |
|---|---|---|---|---|---|---|---|---|
| ⓑ-④ Stand Alone Packet (Flexible) | ID | Flag | Sequence | File Data Length | File Name Length | File Name | File Data | CRC |
| | 10 Bits | 2 Bits (11b) | 4 Bits (0 ~ 15) | 26 Bits | 8 Bits | Max 255 Bits | Max 67,108, 863 Bytes | 2 Bytes |

FIG. 6

| Minor Frame | Fixed M/F No. | 1 Ga | 2 Na | 3 Da | 4 Ra | 5 Ma | 6 Ba | 7 Sa | 8 Ah | 9 Ja | 22 Cha | 23 Ka | 24 Ta | Total Size (Kbytes) |
|---|---|---|---|---|---|---|---|---|---|---|---|---|---|---|
| 1 | 01 | A_1 (120) | B_1 (30) | C_1 (30) | D_1 (8,000) | E_1 (8,000) | F_1 (1,700) | G_1 (1,700) | H_1 (250) | I_1 (7,900) | U_1 (100) | T_1 (5,000) | SI_1 (7,170) | 40,000 |
| 2 | 02 | A_2 (10) | B_2 (30) | C_2 (10) | D_2 (300) | E_2 (200) | F_2 (10) | G_2 (230) | H_2 (250) | I_2 (9,000) | U_2 (100) | T_2 (5,000) | SI_2 (24,860) | 40,000 |
| 3 | 03 | A_3 (10) | B_3 (30) | C_3 (10) | D_3 (300) | E_3 (8,000) | H_3 (250) | I_3 (8,500) | J_1 (5,000) | K_1 (9,000) | U_3 (40) | T_3 (5,000) | SI_3 (2,160) | 40,000 |
| 4 | 04 | A_4 (10) | B_4 (30) | D_4 (8,000) | E_4 (200) | H_4 (250) | J_2 (9,500) | K_2 (9,000) | L_1(1) (1,100) | M_1(1) (1,500) | U_4 (8,000) | T_4 (0) | SI_4 (2,410) | 40,000 |
| 5 | 05 | A_5 (10) | B_5 (30) | H_5 (250) | J_3 (9,200) | K_3 (4,000) | L_1(2) (8,000) | M_1(2) (6,000) | N_1 (150) | O_1 (950) | U_5 (900) | T_5 (5,000) | SI_5 (5,510) | 40,000 |
| 6 | 06 | A_6 (10) | H_6 (250) | J_4 (3,000) | K_4 (3,000) | L_2 (9,700) | M_2 (10) | N_2 (1,500) | O_2 (10) | U_6 (500) | T_6 (5,000) | SI_6 (22,210) | | 40,000 |
| 7 | 07 | H_7 (250) | L_3 (4,500) | M_3 (20) | N_3 (2,500) | O_3 (10) | U_7 (500) | T_7 (5,000) | SI_7 (32,220) | | | | | 40,000 |
| 8 | 08 | H_8 (250) | M_4 (10) | N_4 (250) | O_4 (3,000) | U_8 (3,500) | T_8 (5,000) | SI_8 (27,990) | | | | | | 40,000 |
| 9 | 09 | H_9 (9,600) | M_5 (10) | N_5 (10) | O_5 (3,500) | U_9 (8,000) | T_9 (0) | SI_9 (18,880) | | | | | | 40,000 |
| 10 | 10 | M_6 (10) | N_6 (3,000) | O_6 (10) | U_10 (8,000) | T_10 (0) | SI_10 (28,980) | | | | | | | 40,000 |
| 11 | 11 | M_7 (3,500) | N_7 (300) | U_13 (3,200) | T_11 (0) | SI_11 (33,000) | | | | | | | | 40,000 |
| 12 | 12 | M_8 (10) | N_8 (150) | U_12 (9,500) | T_12 (0) | SI_12 (30,840) | | | | | | | | 40,000 |
| 13 | 13 | N_9 (1,800) | U_13 (1,000) | T_13 (5,000) | SI_13 (32,200) | | | | | | | | | 40,000 |
| 14 | 14 | U_14 (3,000) | U_14 (5,000) | SI_14 (32,200) | | | | | | | | | | 40,000 |
| 15 | 15 | U_15 (2,500) | U_15 (5,000) | SI_15 (32,500) | | | | | | | | | | 40,000 |
| 16 | 01 | SI_1 (40,000) | | | | | | | | | | | | 40,000 |
| 17 | 02 | SI_2 (40,000) | | | | | | | | | | | | 40,000 |
| 18 | 03 | ... | | | | | | | | | | | | 40,000 |

FIG. 7

| M/J | M/N No. | 1 Ga | 2 Na | 3 Da | 4 Ra | 5 Ma | 6 Ba | 7 Sa | 8 Ah | 9 Ja | 22 Cha | 23 Ka | 24 Ta | Total Size (Kbytes) |
|---|---|---|---|---|---|---|---|---|---|---|---|---|---|---|
| 1 | 01 | A_1 (140) | A_2 (15) | A_3 (15) | A_4 (15) | A_5 (15) | A_6 (15) | | | | U_01 (100) | T_01 (5,000) | SI_01 (34,685) | 40,000 |
| | 02 | B_1 (40) | B_2 (40) | B_3 (40) | B_4 (40) | B_5 (40) | | | | | U_02 (100) | T_02 (5,000) | SI_02 (34,700) | 40,000 |
| | 03 | C_1 (40) | C_2 (15) | C_3 (15) | | | | | | | U_03 (40) | T_03 (5,000) | SI_03 (34,980) | 40,000 |
| | 04 | D_1 (9,000) | D_2 (250) | D_3 (9,000) | D_4 (9,000) | | | | | | U_04 (8,000) | T_04 (0) | SI_04 (4,650) | 40,000 |
| | 05 | E_1 (9,000) | E_2 (250) | E_3 (2,500) | E_4 (250) | | | | | | U_05 (900) | T_05 (5,000) | SI_05 (22,100) | 40,000 |
| | 06 | F_1 (19,000) | F_2 (15) | | | | | | | | U_05 (500) | T_06 (5,000) | SI_06 (15,458) | 40,000 |
| | 07 | G_1 (19,000) | G_2 (300) | | | | | | | | U_06 (500) | T_07 (5,000) | SI_07 (18,100) | 40,000 |
| | 08 | H_1 (300) | H_2 (300) | H_3 (300) | H_4 (300) | H_5 (300) | H_6 (300) | H_7 (300) | H_8 (300) | H_9 (11,000) | U_07 (3,500) | T_08 (5,000) | SI_08 (18,100) | 40,000 |
| | 09 | I_1 (9,000) | I_2 (10,000) | I_3 (9,500) | | | | | | | U_08 (8,000) | T_09 (0) | SI_09 (3,500) | 40,000 |
| | 10 | J_1 (6,000) | J_2 (10,500) | J_3 (10,200) | J_4 (3,500) | | | | | | U_05 (8,000) | T_10 (0) | SI_10 (1,800) | 40,000 |
| | 11 | K_1 (10,000) | K_2 (10,000) | K_3 (4,500) | K_4 (3,500) | | | | | | U_09 (3,200) | T_11 (0) | SI_11 (8,800) | 40,000 |
| | 12 | L_1 (10,500) | L_2 (11,000) | L_3 (5,000) | | | | | | | U_05 (9,000) | T_12 (0) | SI_12 (4,500) | 40,000 |
| | 13 | M_1 (8,500) | M_2 (15) | M_3 (30) | M_4 (15) | M_5 (15) | M_6 (15) | M_7 (4,000) | M_8 (15) | | U_10 (1,000) | T_13 (5,000) | SI_13 (21,395) | 40,000 |
| | 14 | N_1 (170) | N_2 (1,700) | N_3 (2,800) | N_4 (300) | N_5 (15) | N_6 (3,500) | N_7 (350) | N_8 (200) | N_9 (2,000) | U_11 (3,000) | T_14 (5,000) | SI_14 (20,965) | 40,000 |
| | 15 | O_1 (1,100) | O_2 (15) | O_3 (15) | O_4 (3,500) | O_5 (4,000) | O_6 (15) | | | | U_12 (2,500) | T_15 (5,000) | SI_15 (23,855) | 40,000 |
| 2 | 01 | A_1 (140) | A_2 (15) | A_3 (15) | A_4 (15) | A_5 (15) | A_6 (15) | | | | U_01 (100) | T_01 (5,000) | SI_01 (34,685) | 40,000 |
| | 02 | B_1 (40) | B_2 (40) | B_3 (40) | B_4 (40) | B_5 (40) | | | | | U_02 (100) | T_02 (5,000) | SI_02 (34,700) | 40,000 |
| | ... | | | | | | | | | | | | | 40,000 |

● U: Undefined Packet    ● T: Telemetry    ● SI: Satellite Image

FIG. 8

METHOD AND SYSTEM FOR TRANSMITTING MULTIPLE DATA

CROSS-REFERENCE TO RELATED APPLICATIONS

This application claims priority under 35 U.S.C § 119 to Korean Patent Application No. 10-2021-0098629 filed in the Korean Intellectual Property Office on Jul. 27, 2021, the entire contents of which are hereby incorporated by reference.

TECHNICAL FIELD

The present disclosure relates to a method and a system for transmitting multiple data, and more particularly, to a method and a system for transmitting multiple data, which are capable of improving efficiency of transmitting multiple data in a network segmentation environment.

BACKGROUND

Security breach such as internal network paralysis, system destruction, information leak due to malicious code infection, and malicious internal information leak by insiders are problems occurring basically because the internal user PC is connected to the internet.

Therefore, the concept of network segmentation has been introduced, which separates the internal PC environment into internet and intranet so as to fundamentally block inflow of malicious codes from the outside into the internal intranet and block leakage of key information of the internal system to the external internet.

That is, the network environment for internal work is blocked from the external internet, and the connection to the internal intranet is blocked in an environment connected to the external internet.

Network segmentation started to be applied in 2008 by the government and public agencies, and under the Information and Communications Network Act, not only the financial sector but also general companies are required apply the network segmentation for PCs that access personal information processing systems.

By dividing into the business network and the internet network through network segmentation, it is possible to prevent breach of internal information and threat of external hacking. On the other hand, however, it has increased user's inconvenience, and many studies are being conducted on how to efficiently transmit data between networks in the network segmentation environment. For example, there are ways to transmit data while strengthening internal security, such as using automatic transfer switch, relay system, shared storage, dedicated cable, secure USB, one-way system, network connection system, and so on.

The physical network separation or logical network separation are also vulnerable to certain breaches. Major vulnerabilities include a vulnerability involving exchange of data infected with malicious codes on USB memories including allowed USB memory, a vulnerability of infecting the business network PC for failing to detect virus infection when data among files downloaded through the internet is transmitted to the business network, a vulnerability of data breach due to intentional data leakage by the internal employees, and so on.

Sustained operation and maintenance of the process after network segmentation are very important. If there is an exception list made during operation after network segmentation or if some are excused from going through the process, this can lead into breach. Accordingly, it is recommended to comply with the approval process when transmitting data between networks, and establish a log management system or anomaly system that collects and analyzes data transmissions between networks. In addition, use of integrated management system should also be considered, which checks for virus or malicious code infection when transmitting data between segregated networks in conjunction with a system for transmitting data between networks and analyzing malicious codes.

The USB is the most common way of transmitting data, which is useful in view of inexpensive cost and capacity to store large volume of information, but it has a shortcoming of security vulnerability. A majority of recent information leaks have been done through USBs, and even the secure USBs, which are used to overcome this shortcoming, are not safe from the risk of information leak.

To improve this, communication lines between the business network and the internet network are removed by utilizing the physical one-way transmission system, and one-way data transmission service is provided using one-way cable and so on. However, since secure USB is still used when sending data the other way around, there still remain risks of information leak and hacking. Accordingly, there is a tendency of switching to physically disconnected two-way network connection system.

Figure 1:
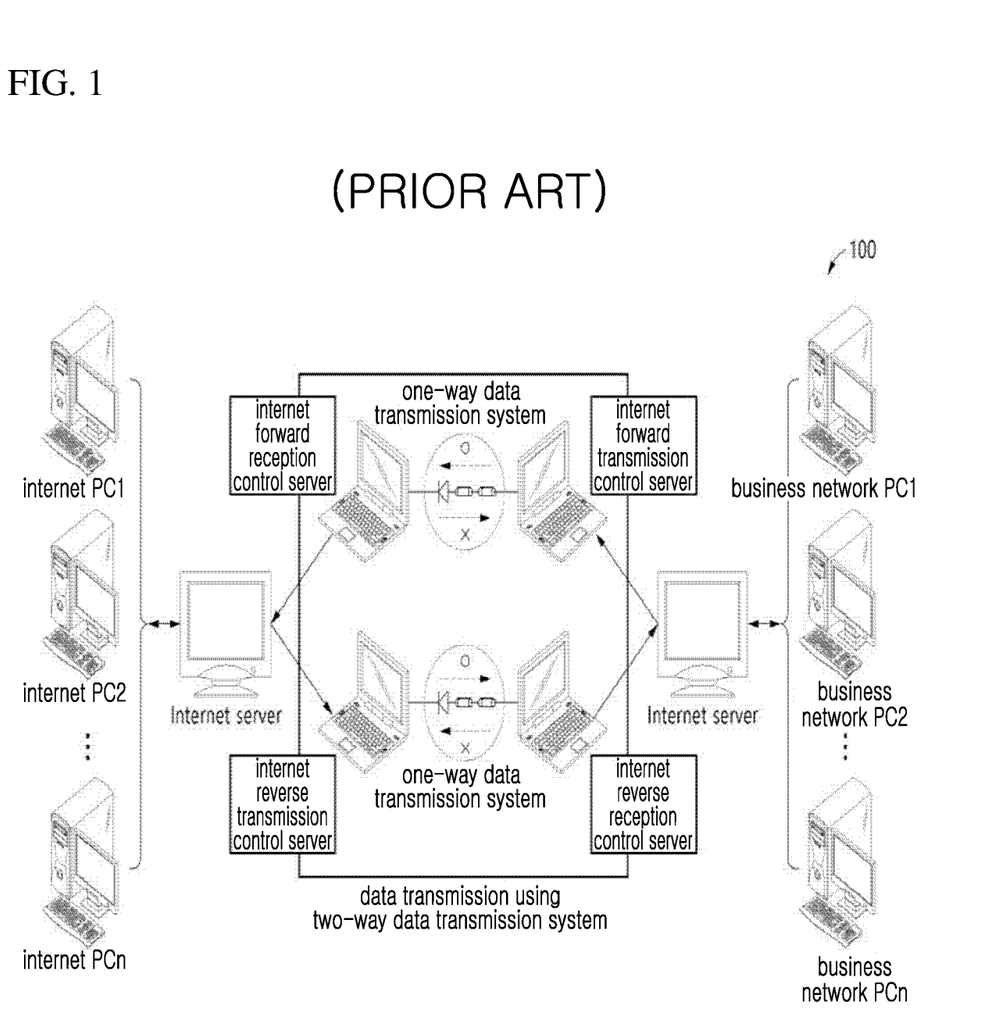
FIG. 1 illustrates a two-way data transmission system in a network segmentation environment according to the related art.
Figure 2A:
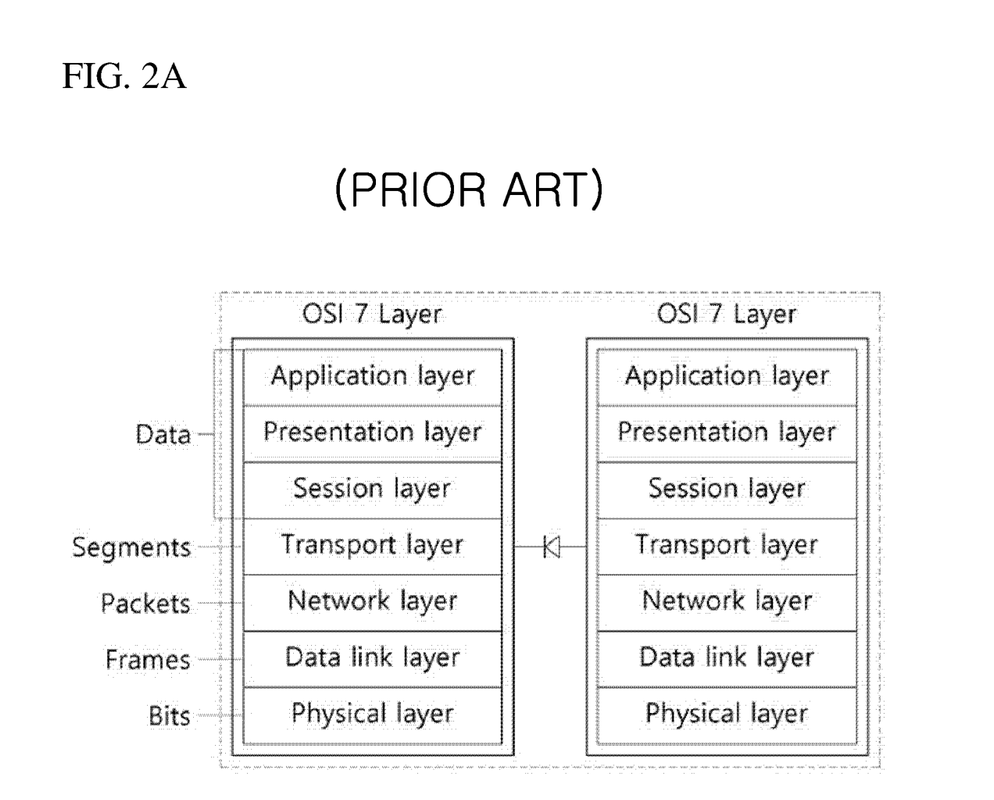
FIGS. 2A and 2B illustrate an OSI layer supported in a two-way data transmission system in a network segmentation environment according to the related art.
Figure 2B:
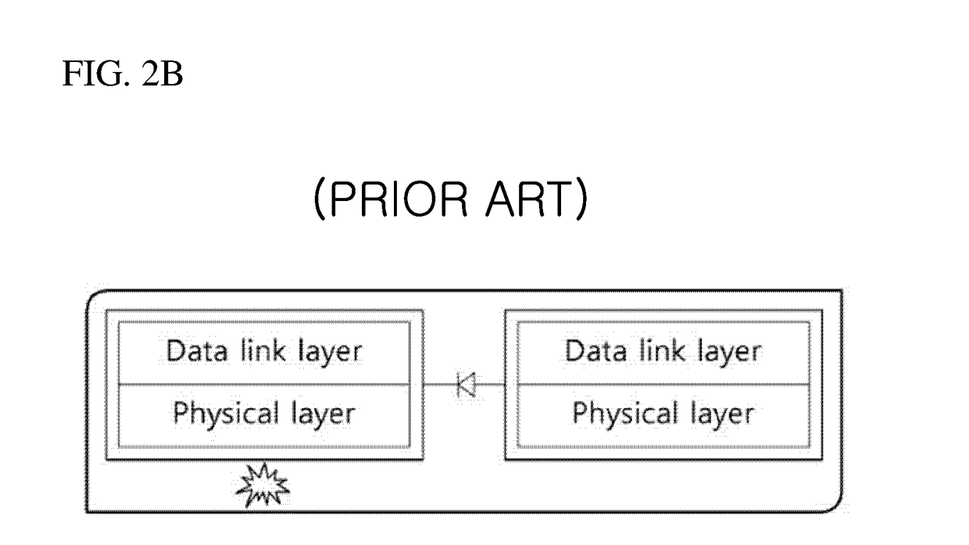

FIG. 1 illustrates a two-way data transmission system in a network segmentation environment according to the related art. FIGS. 2A and 2B illustrate an OSI layer supported in a two-way data transmission system in a network segmentation environment according to the related art.

Referring to FIG. 1, the related two-way data transmission system 100 in the network segmentation environment may be constructed as a dual type of physical forward transmission equipment and reverse transmission equipment by utilizing two sets of existing one-way systems.

The physical forward transmission equipment shown on the upper side is a one-way data transmission system which transmits data in the physical forward direction from the business network (secure zone) to the internet (non-secure zone), and may include an internet reverse transmission control server and an intranet reverse reception control server.

According to the two-way data transmission system 100 described above, it is possible to fundamentally block hacking caused due to two-way communication, because the communication session is provided while the lines between the business network and the internet are physically separated.

In addition, the two-way data transmission system 100 provides a file content filtering function when transmitting forward data from the secure area to the non-secure area so as to prevent internal information leak, while providing a malicious code filtering function together with an IP/Port filtering function for reverse data transmission to ensure that only authorized systems can be operated.

In addition, the two-way data transmission system 100 complies with the national information protection requirements such that, among each of the internal transmission device and the external reception device as the forward transmission equipment, and the external transmission device and the internal reception device as the reverse transmission equipment, the devices in the business network (internal network) corresponding to the secure area perform integrated security management, and communication requests are only available from the secure area to the non-secure area.

Meanwhile, the related one-way transmission equipment is in such a structure that it can not receive a response (ACK) after sending the data, and accordingly, when failure occurs on the reception equipment side, continued transmission of data without recognizing this can result in data loss.

Accordingly, the two-way data transmission system 100 strengthens the security environment through the two-way data transmission which supports only the physical layer and the data link layer shown in FIG. 2B, rather than supporting all of the OSI 7 layers shown in FIG. 2A.

That is, while it is attempted to utilize the features of the physical layer to improve a reliability of the transmission data in the two-way data transmission system 100 by requiring the transmission equipment to recognize the state of the reception equipment before retransmitting the data, since this method can send data one at a time, the network transmission efficiency decreases.

Meanwhile, when amount of data to be transmitted is increased as the number of satellites is increased, or when the transmission path is occupied due to large-capacity data such as telemetry or satellite image, data can not be transmitted urgently between networks until preceding transmission is completed, and accordingly, it is difficult to efficiently transmit data between networks in the related two-way data transmission system 100.

SUMMARY

The technical problem to be solved by the present disclosure is to provide a method and a system for transmitting multiple data, which are capable of improving multiple data transmission efficiency in a network segmentation environment.

In order to solve the problems mentioned above, a method for transmitting multiple data is provided, in which the method is for transmitting data to a second network separated from a first network, and may include receiving a plurality of transmission files for transmission from a transmission device of the first network to a reception device of the second network, and temporarily storing the received files, generating flexible packets by dividing each of the plurality of transmission files by a flexible packet length determined according to size of the files, wherein a transmission file in a size smaller than the flexible packet length among the plurality of transmission files is generated as one flexible packet without being divided, loading the flexible packets into a plurality of flexible frames based on a corresponding transmission file priority according to a maximum data transmission size, and transmitting the plurality of flexible frames to the second network.

The flexible packet may include a transmission file priority ID field, a packet type field, a packet sequence field, a file data size field, a file name size field, a file name field, a file data field, and a cyclical redundancy check (CRC) field.

The transmission file priority ID may be uniquely assigned to the plurality of transmission files.

The method may further include receiving the flexible frames loaded with the flexible packets and restoring the plurality of transmission files, and transmitting the restored transmission files to a reception device belonging to the corresponding second network by referring to the transmission file priority ID.

A predetermined ratio may be previously allocated to each of the plurality of flexible frames, for transmission files corresponding to undefined data, telemetry or satellite image.

Files input from a same transmission device among the plurality of transmission files may be loaded into different flexible frames from each other.

In order to solve the problems mentioned above, a system for transmitting multiple data is provided, in which the system is for transmitting data to a second network separated from a first network, and may include a transmission control device configured to: receive a plurality of transmission files for transmission from a transmission device of the first network to a reception device of the second network, and temporarily store the received files, generate flexible packets by dividing each of the plurality of transmission files by a flexible packet length determined according to size of the files, and when a transmission file among the plurality of transmission files is in a size smaller than the flexible packet length, generate as one flexible packet without dividing the file, load the flexible packets into a plurality of flexible frames based on a corresponding transmission file priority according to a maximum data transmission size, and transmit the plurality of flexible frames to the second network.

The system may further include a reception control device configured to receive the flexible frames loaded with the flexible packets and restore the plurality of transmission files, and transmit the restored transmission files to a reception device belonging to the corresponding second network by referring to the transmission file priority ID.

Accordingly, data transmission efficiency can be improved by modifying the packet structure of data requested for transmission and applying a flexible frame, thus enabling simultaneous transmission of data through a single transmission path between separated networks.

BRIEF DESCRIPTION OF THE DRAWING

Embodiments of the present disclosure will be described with reference to the accompanying drawings described below, in which like reference numerals denote like elements, but are not limited thereto, in which:

FIG. 6 illustrates an example of loading packets to minor frames designed in flexible frame structure and transmitting the same according to an embodiment;

FIG. 7 illustrates an example of transmitting the data transmitted in FIG. 6 by applying a fixed packet design structure.

DETAILED DESCRIPTION

Hereinafter, preferred embodiments of the present disclosure will be described in detail with reference to the accompanying drawings so that those with ordinary knowledge in the art can easily achieve the present disclosure.

Figure 3:
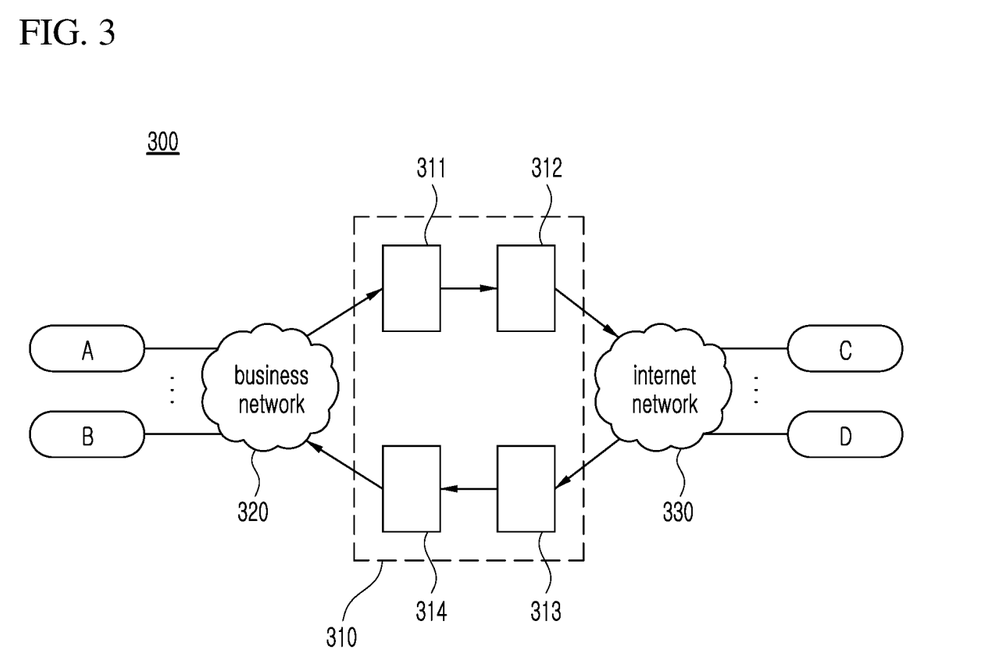
FIG. 3 illustrates a network segmentation environment including a system for transmitting multiple data according to an embodiment.

FIG. 3 illustrates a network segmentation environment including a system for transmitting multiple data according to an embodiment.

Referring to FIG. 3, the system 310 for transmitting multiple data in a network segmentation environment 300 may be a transmission system for enhancing data transmission efficiency between separated networks.

As illustrated, the network segmentation environment 300 may be implemented as a physically separated network by removing the communication line between a business network 320 and an internet network 330.

In an example, the business network 320 may be implemented as an internal intranet requiring security maintenance, and the internet network 330 may be implemented as an external internet.

In addition, the business network 320 may be implemented as a satellite network in which a plurality of satellites are connected.

In this case, devices A and B belonging to the business network 320 are transmission devices for transmitting data to the internet network 330, and may exemplify the satellites K2, K3, K3A, K5, and C-1 or a system provided in each satellite.

The internet network 330 may be implemented as a network connecting a plurality of systems provided in a Ground Control Station (GCS) that communicates with the satellite network.

The devices C and D belonging to the internet network 330 are reception devices for receiving data from the business network 320, and may exemplify telemetry processing system, satellite image processing system, and a Mission Planning System (MPS) and the like.

The system 310 for transmitting multiple data may include a forward transmission control device 311, a forward reception control device 312, a reverse transmission control device 313, and a reverse reception control device 314.

The forward transmission control device 311, the forward reception control device 312, the reverse transmission control device 313 and the reverse reception control device 314 perform the same function as that of the forward transmission control server, the forward reception control server, the reverse transmission control server and the reverse reception control server of FIG. 1. However, when the transmission path is occupied by the large-capacity data in the related two-way data transmission system 100, efficient data transmission between networks is difficult since the transmission of data between the networks can not be performed urgently until preceding transmission is completed. The present disclosure overcomes the above challenge by loading a number of flexible packets to flexible frames designed in a flexible frame structure and transmitting the same, which will be described below. This will be described in detail below.

A file transmitted from a transmission device belonging to the business network 320 to a reception device belonging to the internet network 330 or, conversely, a file transmitted from a transmission device belonging to the internet network 330 to a reception device belonging to the business network 320 are herein called a transmission file.

A packet is the smallest unit of data divided from one file, and one transmission file may be converted into one flexible packet, or separated and converted into several flexible packets and loaded into flexible frames for transmission.

The flexible frame may be loaded with several flexible packets and transmitted, and the number of flexible packets loaded into the flexible frame may be variably adjusted within the maximum data transmission size of the flexible frame.

Figure 4:
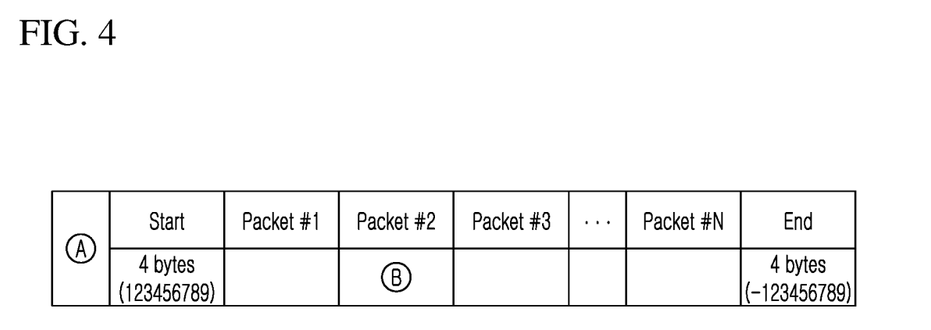
FIG. 4 is a diagram provided to explain a design of a flexible frame according to an embodiment.

FIG. 4 is a diagram provided to explain a design of a flexible frame according to an embodiment.

Referring to FIG. 4, the flexible frame structure (a) may include a start flag (Start) and an end flag (End) having a unique bit pattern indicating the start and end of the frame, and N flexible packets (b) (Packet #1, Packet #2, Packet #3, . . . , Packet #N). As described above, the number of flexible packets loaded into the flexible frame may be flexibly adjusted within the maximum data transmission size of the flexible frame.

Although the start flag (Start) and the end flag (End) are shown as 4 bytes in FIG. 4, they may vary depending on the design of the flexible frame structure.

All flexible packets, including the fill data to remove empty space in the transmitted data, may be filled and transmitted in the flexible frame. In addition, design requirements, such as assigning a unique identification number to each transmission file so that only the designated files are transmitted when transmitting data, performing periodic monitoring, and so on, may be applied. The unique identification number uniquely assigned to each transmission file may be a transmission file priority ID.

The flexible packets (b) loaded into the flexible frame can be designed based on preamble field except for the destination and source addresses, type (length) field, data field, and cyclic redundancy check field in the Ethernet protocol (IEEE 802.3).

Figure 5:
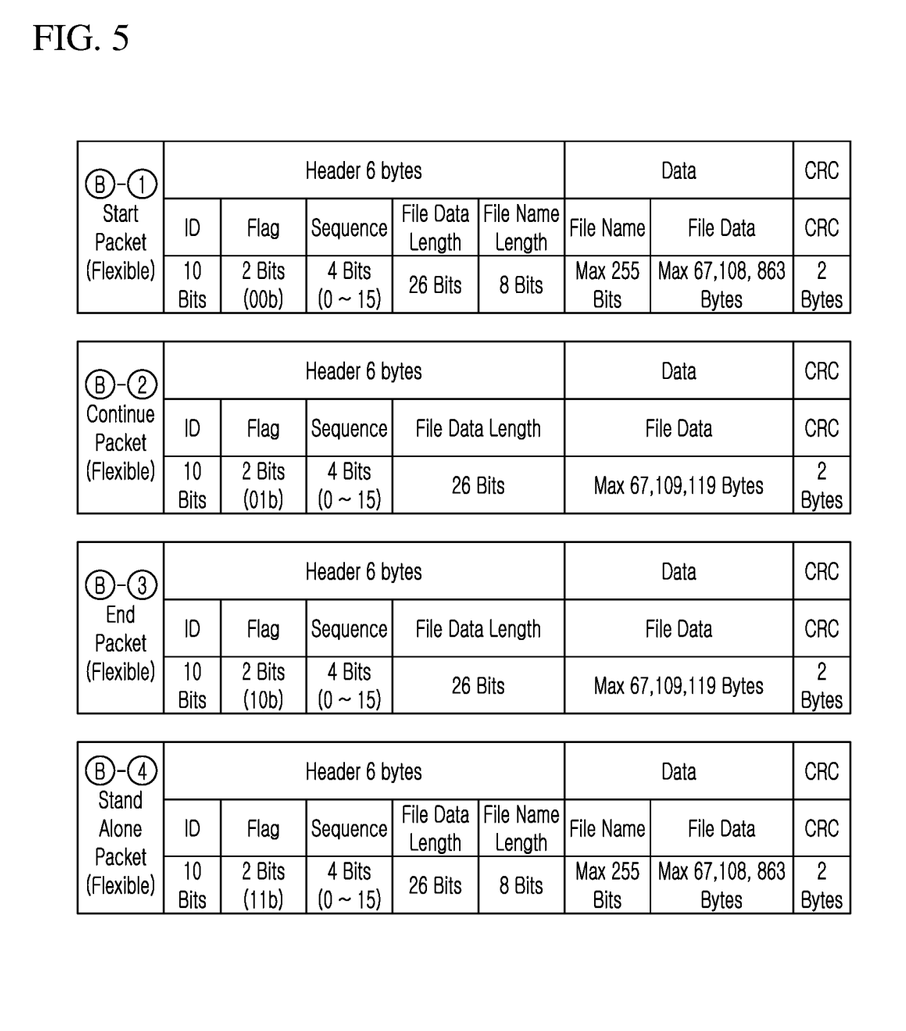
FIG. 5 is a diagram provided to distinguish and explain flexible packet types according to an embodiment.

FIG. 5 is a diagram provided to distinguish and explain flexible packet types according to an embodiment.

Referring to FIG. 5, the flexible packet (b) may be classified as four types, which are Start (b)-(1), Continue (b)-(2), End (b)-(3), Stand Alone (b)-(4), and the like.

Table 1 shows definition of each field of the flexible packet.

TABLE 1

| Field | Definition |
| --- | --- |
| ID | Transmission file priority ID (Defined: 1~990, Undefined: 991~ 97, Telemetry: 998, Image: 999) |
| Flag | Packet Classification: Start(00b), Continue(01b), End(10b), Stand Alone(03b) |
| Sequence | Sequence of Divided Packets |
| F/D Length | Size of Transmission file data |
| F/N Length | Size of Transmission file name |
| File Name | Transmission file name |
| File Data | Transmission file data |
| CRC | Error detection and correction of transmission file data |

'Transmission file priority ID' may be uniquely assigned per transmission file. When designed as listed in Table 1, transmission file priority IDs from 1 to 990 may have been assigned to previously defined transmission files, and transmission file priority IDs from 991 to 997 may be assigned to undefined transmission files to which transmission file priority IDs have not been assigned. The example illustrates that 998 is assigned to a telemetry file and 999 to satellite image file as the transmission file priority IDs. According to an embodiment, the transmission file priority IDs may be assigned differently from the example in Table 3.

The system 310 for transmitting multiple data may store and manage data as a table of the transmission file priority IDs mapped with destination addresses to transmit the corresponding transmission file to and source addresses. Therefore, the forward reception control device 312 and the reverse reception control device 314 may restore the transmission file loaded and transmitted in the flexible frame by the forward transmission control device 311 or the reverse transmission control device 313, and then transmit the restored file to the reception device by referring to the transmission file priority ID corresponding to the transmission file.

For a large size transmission file, the forward transmission control device 311 or the reverse transmission control device 313 may transmit the data by dividing it into Start flexible packet, Continue flexible packet, and End flexible packet, and add, through the Packet Sequence, information on the number of flexible packets transmitted so that the transmission file can be restored according to the Packet Sequence. The data such as satellite image having large file capacity is included in this category.

Stand Alone packet is the one that can transmit related data in one flexible packet at a time, and files having small data capacity are included in this category.

Table 2 is provided to explain an example in which the length of the flexible packets is determined according to the transmission file size according to an embodiment.

TABLE 2

| Flexible Packet Length | Transmission File Size Range |
|---|---|
| 100 | 0~999 |
| 250 | 1,000~2,999 |
| 500 | 3,000~4,999 |
| 1,000 | 5000~ |
| Flexible | Flexible |

Table 2 shows that when the transmission file size is in a range of 0 to 999 bytes, the flexible packet length is determined to be 100 bytes, and when the transmission file size is in a range from 1,000 and 2,999 bytes, the flexible packet length is determined to be 250 bytes, and when the transmission file size is in a range from 3,000 to 4,999 bytes, the flexible packet length is determined to be 500 bytes, and when the transmission file size is in a range of 5000 bytes or more, the flexible packet length is determined to be 1,000 bytes. In addition, the transmission file size range and the flexible packet length are indicated 'flexible' in order to show that the flexible packet length is flexibly determined according to the type of transmission file regardless of the transmission file size range.

TABLE 3

| Serial No. | Transmission File Name | Flexible Packet Length | Transmission File Size | Number of Flexible Packets | Transmission File Size Range |
|---|---|---|---|---|---|
| 1 | A-1 | 100 | 120 | 2 | 0~999 |
| 2 | F-1 | 250 | 1,700 | 7 | 1,000~2,999 |
| 3 | K-1 | 500 | 3,000 | 6 | 3,000~4,999 |
| 4 | D-1 | 1,000 | 8,000 | 8 | 5000~ |
| 5 | SI-1 | Flexible | 34,500 | Flexible | Flexible |

Table 3 shows an example in which the transmission file is separated and converted into several flexible packets according to a reference determined in Table 2.

For example, when the transmission file A-1 is input, the data size is analyzed and the transmission file size is checked, and since the transmission file size is 120 bytes, it corresponds to the transmission file size range of 0-999 bytes, so the flexible packet length may be determined to be 100 bytes. Therefore, the transmission file A-1 may be divided into two flexible packets, and Packet Sequences 1 and 2 may be assigned to the two flexible packets, respectively.

Transmission files F-1, K-1, and D-1 corresponding to Serial Nos. 2 to 4 are also divided into several flexible packets by applying a flexible packet length determined according to the transmission file size, and Packet Sequence may be provided to the divided flexible packets in order.

Meanwhile, transmission file SI-1 corresponding to Serial No. 5 may correspond to satellite image, and the flexible packet length of the satellite image can be flexibly adjusted according to the circumstance the data is loaded into the flexible frame.

FIG. 6 illustrates an example of loading packets to minor frames designed in flexible frame structure and transmitting the same according to an embodiment.

Referring to FIG. 6, the transmission files A-1, B-1, C-1, D-1, . . . , I-1 are loaded into the first minor frame in order according to the priority of the transmission file priority ID. Further, it is illustrated that transmission files U-1, T-1, and SI-1 corresponding to undefined data, telemetry, and satellite image are loaded into the first minor frame.

While it may vary according to the flexible frame designs, a predetermined ratio may be allocated to the flexible frame for the transmission file corresponding to undefined data, telemetry or satellite image. Therefore, loading a transmission file corresponding to undefined data, telemetry or satellite image can start from the first minor frame, regardless of the priority according to the transmission file priority ID.

As described above, since the space remaining after loading the flexible packet in the first minor frame is 7,170 Kbytes, the remaining space may be loaded with the satellite image with the corresponding size of flexible packet length.

Meanwhile, among the transmission files described as being loaded into the second minor frame, files A-2, B-2, C-2, D-2, . . . , I-2 are transmission files transmitted from the same system, that is, transmission device as files A-1, B-1, C-1, D-1, . . . , I-1, respectively. In an implementation, the files input from the same transmission device among a plurality of transmission files may be loaded into different flexible frames.

When data is transmitted as illustrated in FIG. 6 through the flexible packet structure according to the present disclosure, all data except for the satellite image are transmitted before the 16th minor frame, and starting from the 16th minor frame, only the satellite image is transmitted.

FIG. 7 illustrates an example of transmitting the data transmitted in FIG. 6 by applying a fixed packet design structure.

The fixed packet design structure of FIG. 7 is an example in which a major frame consists of 15 minor frames based on a fixed packet. When data is input to a specific system, the data is transmitted through the fixed packet of the minor frame assigned to the system.

When the same transmission file is transmitted through the flexible packet structure illustrated in FIG. 6, it takes 352 seconds, whereas when the same transmission file is transmitted through the fixed packet structure illustrated in FIG. 7, it takes 680 seconds, revealing that there is an approximately 1.9 times speed improvement when using the flexible packet structure according to the present disclosure.

Figure 8:
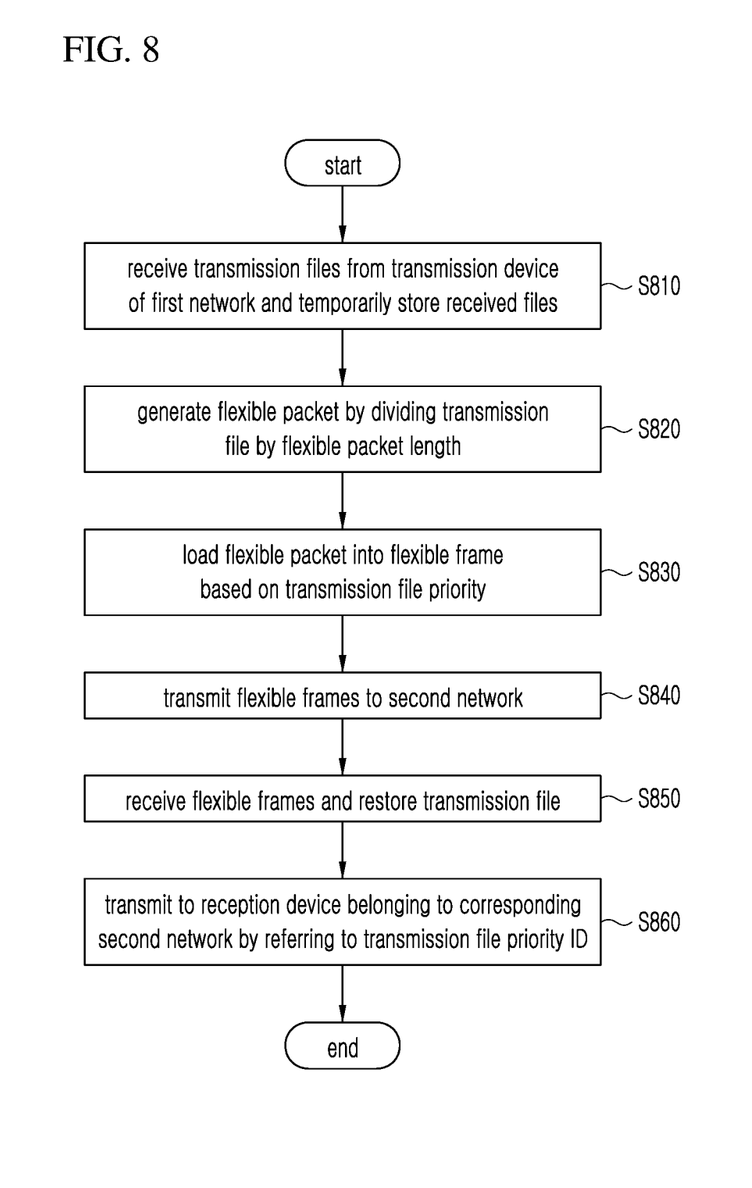
FIG. 8 is a flowchart illustrating a method for operating a system for transmitting multiple data according to an embodiment.

FIG. 8 is a flowchart illustrating a method for operating a system for transmitting multiple data according to an embodiment.

Referring to FIG. 8, first, the transmission control devices 311 and 313 of the system 310 for transmitting multiple data may receive a plurality of transmission files for transmission from a transmission device belonging to a first network to a reception device belonging to a second network, and temporarily store the same, at S810.

In addition, the transmission control devices 311 and 313 may generate a flexible packet by dividing each of the plurality of temporarily stored transmission files by the flexible packet length determined according to file size, at S820. At S820, a transmission file having a file size smaller than the packet length among a plurality of transmission files may be generated as one flexible packet without being divided.

Then, the transmission control devices 311 and 313 may load the flexible packets generated at S820 into a plurality of flexible frames based on the corresponding transmission file priority, according to the maximum data transmission size, at S830.

Next, the transmission control devices 311 and 313 may sequentially transmit to the second network a plurality of flexible frames in which several flexible packets are loaded according to the maximum data transmission size, at S840.

Then, the reception control devices 312 and 314 may receive the flexible frames loaded with several flexible packets and restore a plurality of transmission files, at S850.

Then, the reception control devices 312 and 314 may transmit the restored transmission files to the reception device belonging to the corresponding second network by referring to the transmission file priority ID, at S850.

The embodiments described above may be implemented as a hardware component, a software component, and/or a combination of a hardware component and a software component. For example, the devices, methods, and components described in the embodiments may be implemented by using one or more general computer or specific-purpose computer such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, although it is described in certain examples that one processing device is used, one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, or computer storage medium or device, permanently or temporarily. The software may be distributed over networked computer systems and stored or executed in a distributed manner. The software and data may be stored on one or more computer-readable recording media.

The method according to the embodiments may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in an order different from the described method, and/or even when the components of the system, structure, device, circuit, and the like are coupled or combined in a form different from the way described, or replaced or substituted by other components or equivalents, an appropriate result can be achieved.

The invention claimed is:

1. A method for transmitting multiple data, wherein the method is for transmitting data to a second network separated from a first network, the method comprising:
receiving a plurality of transmission files for transmission from a transmission device of the first network to a reception device of the second network, and temporarily storing the received files;
determining a flexible packet length for each of the plurality of transmission files according to size of each of the plurality of transmission files and generating a plurality of flexible packets by dividing each of the plurality of transmission files by the flexible packet length, wherein a transmission file in a size smaller than the flexible packet length among the plurality of transmission files is generated as one flexible packet without being divided;
loading the plurality of flexible packets into a plurality of flexible frames based on a corresponding transmission file priority according to a maximum data transmission size;
transmitting the plurality of flexible frames to the second network;
receiving the flexible frames loaded with the flexible packets and restoring the plurality of transmission files; and
transmitting the restored transmission files to a reception device belonging to the second network by referring to the transmission file priority ID;
wherein the determining the flexible packet length includes
determining a size of a transmission file to be transmitted of the plurality of transmission files, and determining one out of a plurality of flexible packet lengths usable for transmission to be a packet length used for transmission of the transmission file to be transmitted, based on the size determined for the transmission file to be transmitted;

wherein a flexible packet comprises a transmission file priority ID field, a packet type field, a packet sequence field, a file data size field, a file name size field, a file name field, a file data field, and a cyclical redundancy check (CRC) field; and wherein a transmission file priority ID is uniquely assigned to the plurality of transmission files.

2. The method of claim 1, wherein a predetermined ratio is previously allocated to each of the plurality of flexible frames, for transmission files corresponding to undefined data, telemetry or satellite image.

3. The method of claim 1, wherein files input from a same transmission device among the plurality of transmission files are loaded into different flexible frames from each other.

4. A system for transmitting multiple data, wherein the system transmits data to a second network separated from a first network, and comprises a hardware processor to implement a transmission control device configured to:

receive a plurality of transmission files for transmission from a transmission device of the first network to a reception device of the second network, and temporarily store the received files;

determine a flexible packet length for each of the plurality of transmission files according to size of each of the plurality of transmission files and generate a plurality of flexible packets by dividing each of the plurality of transmission files by the flexible packet length, and when a transmission file among the plurality of transmission files is in a size smaller than the flexible packet length, generate as one flexible packet without dividing the file;

load the plurality of flexible packets into a plurality of flexible frames based on a corresponding transmission file priority according to a maximum data transmission size; and transmit the plurality of flexible frames to the second network;

wherein the system further comprises a hardware processor to implement a reception control device configured to receive the flexible frames loaded with the flexible packets and restore the plurality of transmission files, and transmit the restored transmission files to a reception device belonging to the second network by referring to the transmission file priority ID;

wherein to determine the flexible packet length, the transmission control device is configured to determine a size of a transmission file of the plurality of transmission files, and determine one out of a plurality of flexible packet lengths usable for transmission to be a packet length used for transmission of the transmission file, based on the size determined for the transmission file;

wherein a flexible packet comprises a transmission file priority ID field, a packet type field, a packet sequence field, a file data size field, a file name size field, a file name field, a file data field, and a cyclical redundancy check (CRC) field; and wherein a transmission file priority ID is uniquely assigned to the plurality of transmission files.

5. The system of claim 4, wherein a predetermined ratio is previously allocated to each of the plurality of flexible frames, for transmission files corresponding to undefined data, telemetry or satellite image.

6. The system of claim 4, wherein files input from a same transmission device among the plurality of transmission files are loaded into different flexible frames from each other.

* * * * *